(12) United States Patent
Ruiz

(10) Patent No.: US 8,472,776 B2
(45) Date of Patent: Jun. 25, 2013

(54) WEDGE SHAPED FIBER RETAINER RING

(75) Inventor: Gil Ruiz, McKinney, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 426 days.

(21) Appl. No.: 12/707,265

(22) Filed: Feb. 17, 2010

(65) Prior Publication Data

US 2010/0209064 A1 Aug. 19, 2010

Related U.S. Application Data

(60) Provisional application No. 61/153,626, filed on Feb. 18, 2009.

(51) Int. Cl.
*G02B 6/00* (2006.01)
(52) U.S. Cl.
USPC ............................ 385/136; 385/135; 385/134
(58) Field of Classification Search
USPC ........................................................ 385/136
See application file for complete search history.

(56) References Cited

U.S. PATENT DOCUMENTS

| | | | |
|---|---|---|---|
| 4,609,171 A * | 9/1986 | Matsui | 248/74.3 |
| 4,655,489 A | 4/1987 | Bisbing | |
| D318,123 S * | 7/1991 | Yokoyama et al. | D24/129 |
| 5,689,605 A | 11/1997 | Cobb | |
| 5,710,855 A * | 1/1998 | Konwitz | 385/135 |
| 6,250,816 B1 * | 6/2001 | Johnston et al. | 385/53 |
| 6,510,274 B1 * | 1/2003 | Wu et al. | 385/137 |
| 7,010,210 B2 * | 3/2006 | Dufour | 385/136 |
| 7,031,588 B2 | 4/2006 | Cowley | |
| 7,068,907 B2 * | 6/2006 | Schray | 385/135 |
| 7,825,337 B2 * | 11/2010 | Young, IV | 174/72 A |
| 2004/0052493 A1 * | 3/2004 | Lavoie | 385/137 |
| 2004/0099773 A1 | 5/2004 | Sono | |
| 2004/0240827 A1 | 12/2004 | Daoud | |
| 2007/0082541 A1 * | 4/2007 | Alloway et al. | 439/492 |
| 2007/0221793 A1 * | 9/2007 | Kusuda et al. | 248/71 |
| 2007/0274645 A1 | 11/2007 | Murano | |

* cited by examiner

*Primary Examiner* — Hemang Sanghavi
(74) *Attorney, Agent, or Firm* — Muncy, Geissler, Olds & Lowe PLLC

(57) ABSTRACT

A fiber retainer ring includes a bottom wall having a first end and a second end, a side wall projecting from the bottom wall first end and including a distal end, and a top wall connected to the bottom wall second end and forming a ramp inclined relative to the bottom wall. Also a method of installing a module in a shelf provided with such retainer rings.

18 Claims, 4 Drawing Sheets

WEDGE SHAPED FIBER RETAINER RING

CROSS-REFERENCE TO RELATED APPLICATIONS

The present application claims the benefit of U.S. Provisional Patent Application No. 61/153,626, filed Feb. 18, 2009, the entire contents of which is hereby incorporated by reference.

BACKGROUND OF THE INVENTION

Data centers that support one or more businesses, factories or residential areas typically comprise one or more racks or cabinets filled with interconnection sites for optical fibers and fiber optic cables. In a typical installation, fiber optic cables that include multiple optical fibers from an external source (these are often known as "outside plant" or "OSP" fibers) enter the cabinet and are spliced together with individual optical fibers known as "pigtails." Splicing typically occurs in a splice tray or similar component that includes multiple splice sites. The pigtail fibers are then connected within the cabinet to standard termination sites. The termination sites include termination ports that connect optically with "jumper" optical fibers or patch cords that exit the rack or cabinet to supply data or other information in optical form to the remainder of the building or site. The termination sites can be provided in a number of forms, including fiber distribution cartridges, fiber distribution modules, multi-position adapter couplers and/or bezels.

Patch cords leaving the termination sites are often routed along a support in front of the termination sites toward the side of the shelf. A plurality of patch cords 200 exiting termination sites 202 mounted in a shelf 204 having an opening 205 are illustrated in FIG. 9. It is known to provide fiber retainer rings 206, illustrated in FIG. 8, for retaining and organizing the patch cords 200 leaving each of the plurality of horizontally aligned termination sites 202. These rings may be flexible and include a gap 208 that can be opened sufficiently wide to allow the patch cords 200 to be inserted and removed. These retainers 206 are mounted in close proximity to the termination sites and generally must be removed when a termination site is added to or removed from the shelf to avoid interfering with the installation and/or removal of the termination site. It may also be difficult to access the patch cords closest to the retainer rings because of the small space between the retainer rings and the termination sites. Placing the fiber retainer rings further away from the termination sites might reduce such problems but would disadvantageously increase the size of the shelf assemble. It would therefore be desirable to provide an improved fiber retainer ring that supports a high density of patch cords, is easy to use and that does not significantly interfere with the mounting and removal of termination sites or with accessing certain patch cords connected to the termination sites.

SUMMARY OF THE INVENTION

These problems and others are addressed by embodiments of the present application, a first aspect of which comprises a fiber retainer ring that includes a bottom wall having a first end and a second end, a side wall projecting from the bottom wall first end and including a distal end, and a top wall connected to the bottom wall second end and forming a ramp inclined relative to the bottom wall.

Another aspect of the invention comprises a fiber retainer ring formed from a continuous strip of flexible material. The strip includes a strip first end portion which has a first end having an edge and a second end, and a bottom portion extending generally perpendicularly from the first end portion second end. The bottom portion has a first end at the second end of the first end portion and a second end, and the strip includes a cusp at the bottom portion second end turning away from the bottom portion. The strip also includes a top portion extending from the cusp at an acute angle to the bottom portion that overlies the bottom portion, and the top portion has a first end at the cusp and a second end. The strip also includes a strip second end portion extending from the top portion second end toward the bottom portion, and the strip second end portion includes an edge.

A further aspect of the invention comprises a method of installing a fiber optic module in a shelf supporting a wedge-shaped fiber retainer ring as described above, which method includes aligning the fiber optic module with an opening on the shelf, placing the module on the ramp formed by the fiber retainer ring top wall, sliding the module along the ramp and into position on the shelf, and securing the module to the shelf.

BRIEF DESCRIPTION OF THE DRAWINGS

These aspects of the invention and others will be better understood after a reading of the following detailed description together with the attached drawings wherein.

DETAILED DESCRIPTION

Figure 1:
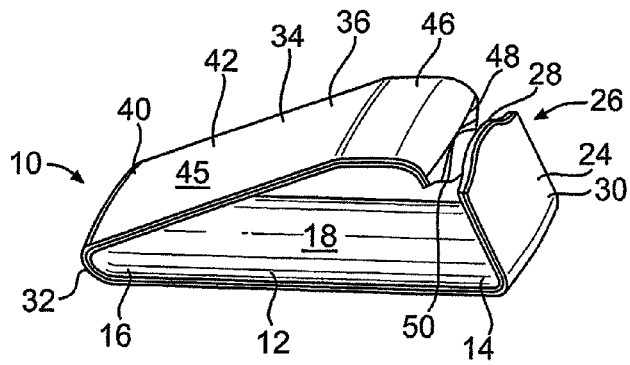
FIG. 1 is a perspective view of a fiber retainer ring according to an embodiment of the present invention.
Figure 2:
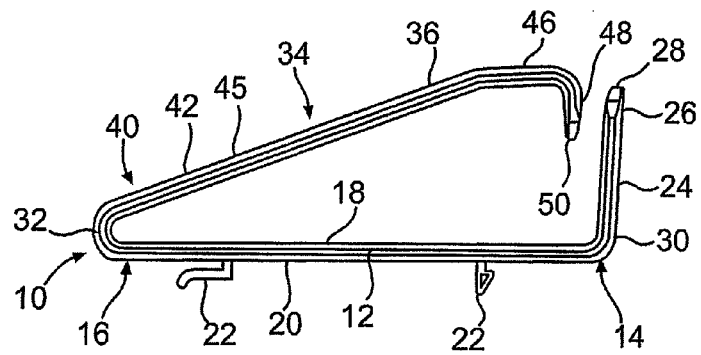
FIG. 2 is a side elevational view of the fiber retainer ring of FIG. 1.
Figure 3:
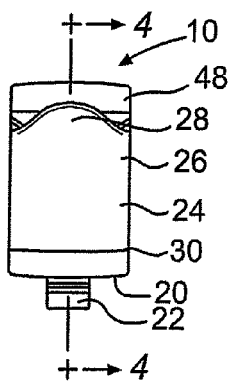
FIG. 3 is a front elevational view of the fiber retainer ring of FIG. 1.
Figure 4:
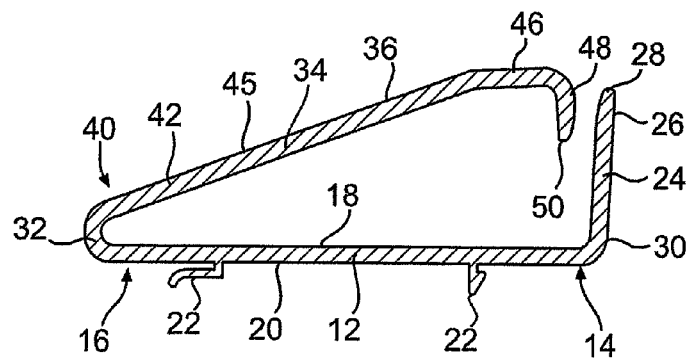
FIG. 4 is a sectional elevational view taken along line IV-IV in FIG. 3.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

FIG. 1 illustrates a fiber retainer ring 10 according to an embodiment of the present invention which fiber ring 10 is formed form a continuous strip 11 of flexible material and includes a bottom wall 12. The bottom wall 12 has a first end 14, a second end 16, a convex top surface 18 and a bottom surface 20, and the bottom surface 20 includes first and second mounting tabs 22 projecting away from the bottom wall 12. A first end portion 24 of strip 11 forms a side wall 24 that projects away from the first end 14 of the bottom wall 12. First end portion 24 includes a first or distal end 26 having a hump 28 and a second end 30 at first end 14 of bottom wall 12. Second end 16 of bottom wall 12 includes a cusp 32 which may be arcuate as illustrated or, alternately, angular (not illustrated), at which cusp bottom wall 12 turns back on itself to form top wall 34. Top wall 34 forms a ramp 36 that is inclined with respect to the bottom wall 12 and includes first end 40 at cusp 32, a ramp portion 42 having a ramp surface 45 extending from first end 40, a parallel portion 46 generally parallel to bottom wall 12 extending from ramp portion 42, and a second end portion 48 of strip 11 extends from parallel portion 46 toward a location on bottom wall 12 between the first end 14 and second end 16 of bottom wall 12. Second end portion 48 of strip 11 includes an end edge 50 and is generally parallel to first end portion 24 of strip 11 and spaced therefrom.

Figure 5:
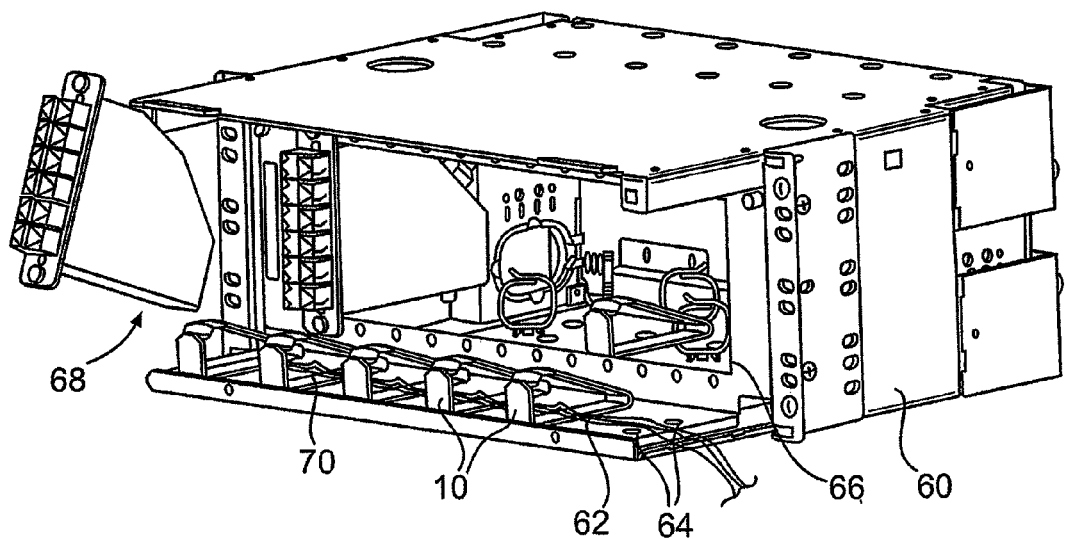
FIG. 5 is front perspective view of a termination site being mounted in a shelf that includes a plurality of the fiber retainer rings of FIG. 1.

FIG. 5 illustrates a fiber management shelf 60 that includes a trough 62 on which a plurality of fiber retainer rings 10 are mounted by inserting mounting tabs 22 into openings 64 on the trough. Fiber management shelf 60 includes an opening 66 into which modules 68 are mounted. Patch cords 70 connectable to modules 68 are inserted into fiber retainer rings 10 by pressing a portion of the patch cords 70 between the side wall 24 and second end portion 48 of the fiber retainer ring, flexing top wall 34 of the fiber retainer ring 10 toward or away from bottom wall 12 as necessary to make room for the patch cords 70 to enter the interior of the ring 10. The hump 28 at the end of side wall 24 and the curved surface between parallel portion 46 and second end 48 facilitates the insertion of the patch cords 70 into the ring, and the hump shaped end edge 50 of strip second end 48 helps to retain the patch cords in the ring 10. Once in the ring 10, the convex top surface 18 of bottom wall 12 forms a bend limiter and reduces the likelihood that a fiber optic patch cord will be bent in a manner that exceeds its bend radius when passing through the rings 10. All interior surfaces of the ring 10 may be convex like top surface 18 of bottom wall 12 to provide additional bend limiting surfaces if desired.

Figure 6:
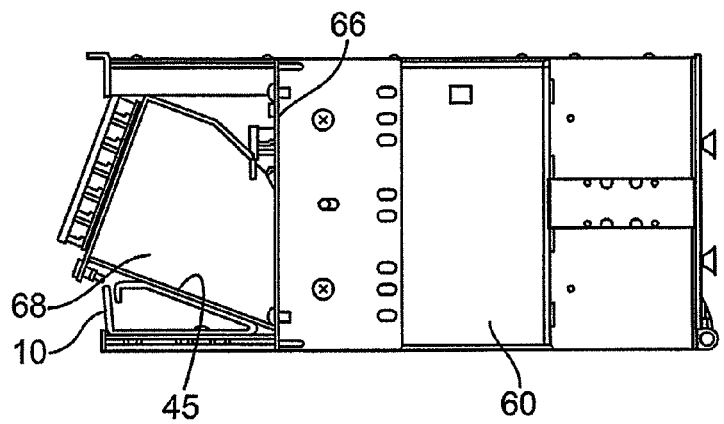
FIG. 6 is a side elevational view of the termination site of FIG. 5 being installed in the shelf of FIG. 5 over the top of one of the fiber retainer rings.
Figure 8:
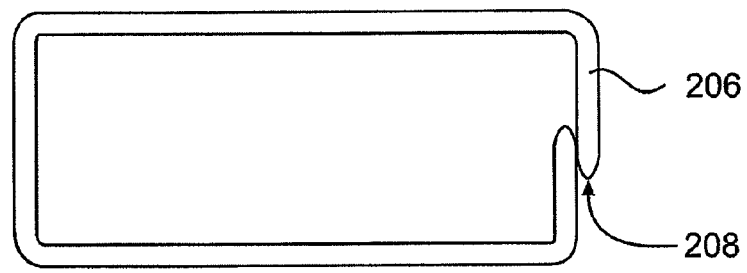
FIG. 8 is a side elevational view of a conventional fiber retainer ring.
Figure 9:
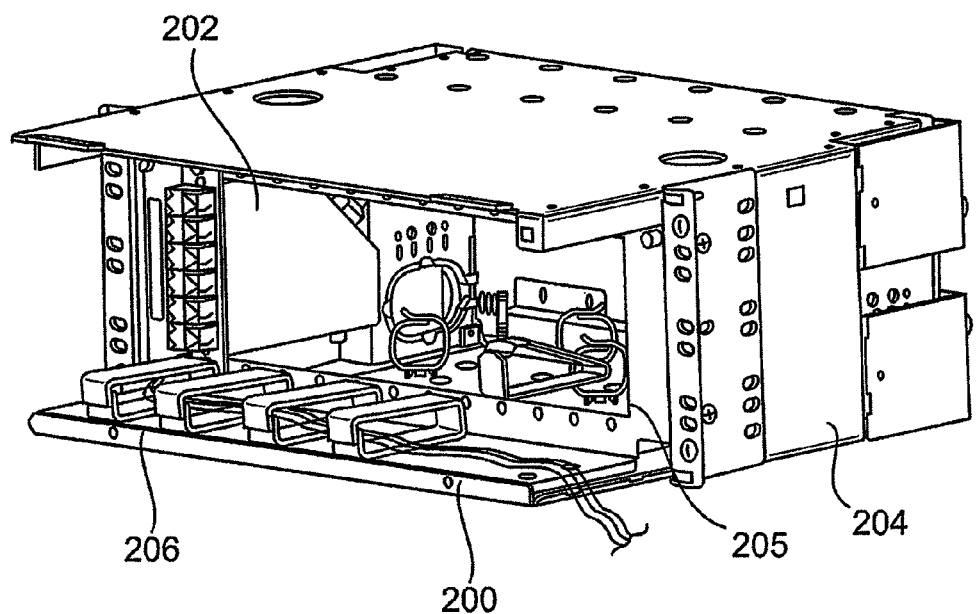
FIG. 9 is a perspective view of a termination site mounted in a shelf that includes conventional fiber retainer rings.

The conventional fiber retainer rings 206 of FIG. 8 partially block the opening 205 in fiber management shelf 240 and thus generally must be removed before a module 202 is inserted or removed from the fiber management shelf. Furthermore, because of the close fit between the patch cords 200 in the modules 202 of the conventional art and the conventional retainer rings 206, the patch cords 200 themselves must generally be removed from at least the lowermost receptacles of the modules 202 before the modules 202 are inserted or removed in the shelf 204. However, as will be apparent from FIG. 5, the wedge-shaped cross-section of fiber retainer rings 10 provides adequate space adjacent opening 66 in shelf 60 for a module 68 to be inserted in opening 66 without removing fiber management ring 10 or patch cords 70 from the module 68. In fact, as illustrated in FIG. 6, ramp surface 45 provides a guide for sliding modules 68 into opening 66, and the ring 10 flexes as necessary about cusp 32 to allow module 68 to pass and then rebounds to its original configuration. This benefit is accomplished without significantly reducing the area of the interior of ring 10, and thus ring 10 retains the ability to hold as many patch cords as are generally needed on a shelf of the type illustrated. Modules 68 can be removed from opening 66 by sliding them along ramp surface 45 in the opposite direction from that described above. This arrangement allows modules to be inserted and removed as necessary without the need to remove patch cords from the modules or remove the fiber retainer rings from the shelf.

Figure 7:
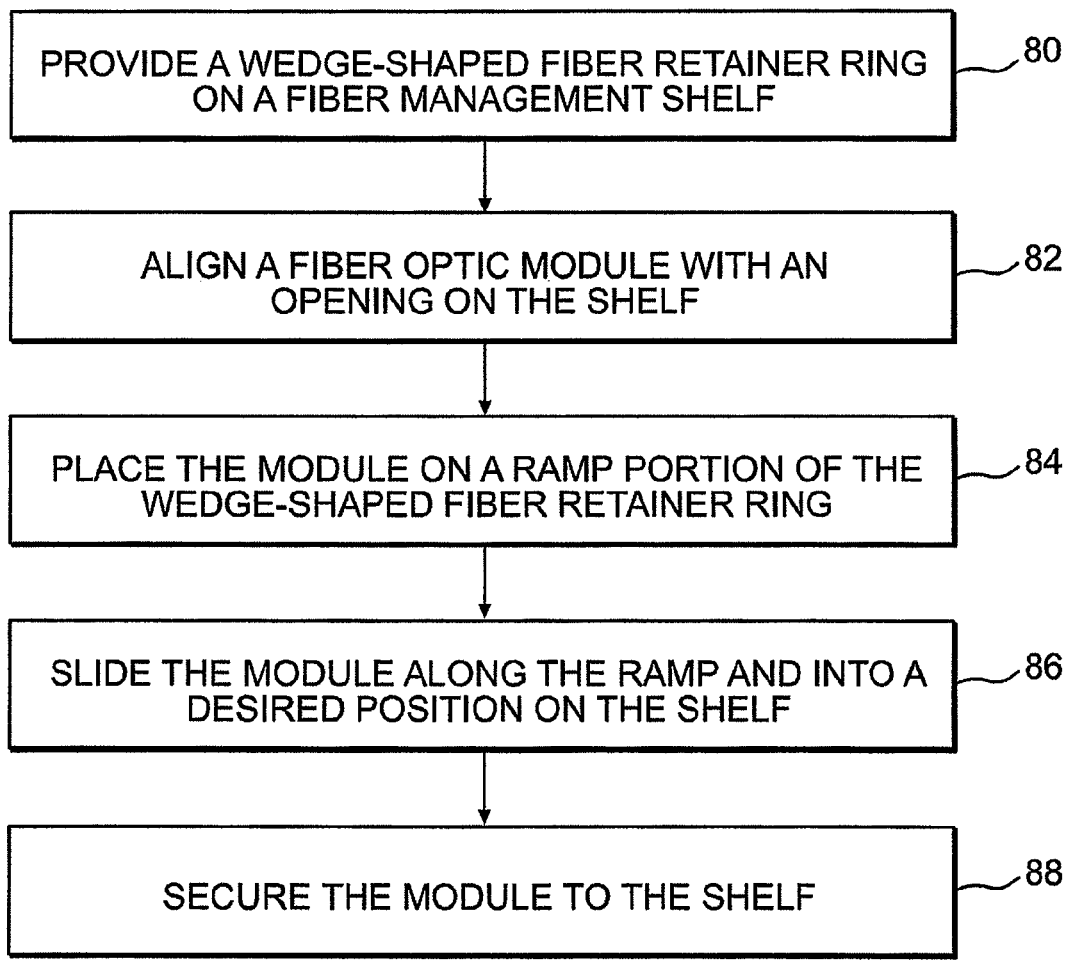
FIG. 7 is flow chart illustrating a method according to an embodiment of the present invention.

A method according to an embodiment of the present invention, as illustrated in FIG. 7, includes a step 80 of providing a fiber retainer ring 10 on a fiber management shelf, a step 82 of aligning a fiber optic module with an opening on the shelf, a step 84 of placing the module on the ramp formed by the ring 10, a step 86 of sliding the module along the ramp and into a desired position on the shelf, and a step 88 of securing the module to the shelf.

The present invention has been described herein in terms of presently preferred embodiments. Modifications and additions to these embodiments will become clear to those of ordinary skill in the relevant art upon a reading of the foregoing description. It is intended that all such modifications and additions comprise a part of the present invention to the extent they fall within the scope of the several claims appended hereto.

I claim:

1. A fiber retainer ring comprising:
a bottom wall having a first end and a second end;
a side wall projecting from said bottom wall first end and including a distal end; and
a top wall having a first end connected to said bottom wall second end and forming a ramp inclined relative to said bottom wall,
wherein, said top wall includes a second end spaced from said side wall by a gap opening upwardly away from said bottom wall, and
wherein said top wall includes a ramp portion connected to said bottom wall by an arcuate portion, a parallel portion generally parallel to said bottom wall and extending from said ramp portion, and wherein said second end comprises an end portion extending from said parallel portion toward said bottom wall and having an end edge.

2. The fiber retainer ring of claim 1 wherein said fiber retainer ring has a wedge-shaped cross section through said top wall and said bottom wall.

3. The fiber retainer ring of claim 1 wherein said top wall end portion is spaced from and generally parallel to said side wall and overlies said bottom wall.

4. The fiber retainer ring of claim 1 wherein said side wall distal end comprises a hump.

5. The fiber retainer ring of claim 1 wherein said bottom wall comprises an elongated strip of material having a convex top surface facing said top wall.

6. The fiber retainer ring of claim 1 wherein said bottom wall includes a bottom surface, said bottom surface including first and second mounting tabs projecting away from said bottom wall.

7. The fiber retainer ring of claim 1 wherein said ramp portion includes a ramp surface facing away from said bottom wall and wherein a distance from said bottom wall to said ramp surface increases in a direction from said arcuate portion toward said parallel portion.

8. A fiber retainer ring formed from a continuous strip of flexible material, said strip including a strip first end portion having a length and a first end having an edge and a second end, a bottom portion extending generally perpendicularly from said first end portion second end, said bottom portion having a first end at said second end of said first end portion and a second end, a cusp at said bottom portion second end turning away from said bottom portion, a top portion extending from said cusp at an acute angle to said bottom portion and overlying said bottom portion, said top portion having a first end at said cusp and a second end, and a strip second end portion extending from said top portion second end, said strip second end portion including an edge, said strip second end portion edge being spaced from said first end portion by a gap opening upwardly away from said bottom and said strip second end portion edge being spaced from said bottom by a distance less than said length.

9. The fiber retainer ring of claim 8 wherein said cusp is arcuate.

10. The fiber retainer ring of claim 9 wherein said top portion includes a top surface facing away from said bottom portion and wherein a distance from said bottom portion to said top portion top surface increases in a direction from said cusp toward said first end portion.

11. The fiber retainer ring of claim 8 wherein said strip second end portion is generally parallel to said strip first end portion and overlies said bottom portion.

12. The fiber retainer ring of claim 11 wherein said first end portion edge comprises a hump.

13. The fiber retainer ring of claim 10 wherein said bottom portion includes a convex top surface facing said top portion.

14. The fiber retainer ring of claim 10 wherein said bottom portion includes a bottom surface, said bottom surface including first and second mounting tabs projecting away from said bottom portion.

15. A method of installing a fiber optic module in a shelf supporting a fiber retainer ring the fiber retaining ring comprising a bottom wall having a first end and a second end, a side wall projecting from said bottom wall first end and including a distal end, and a top wall connected to said bottom wall second end and forming a ramp inclined relative to said bottom wall,
the method comprising:
aligning the fiber optic module with an opening on the shelf;
placing the module on the ramp formed by the fiber retainer ring top wall;
sliding the module along the ramp and into position on the shelf; and
securing the module to the shelf.

16. The method of claim 15 including attaching a plurality of patch cords to the module.

17. The method of claim 16 including removing the module from the shelf and sliding the module along the ramp formed by the fiber retainer ring without removing the patch cords.

18. The method of claim 15 including inserting a plurality of patch cords between said side wall distal end and a portion of said top wall into a space between said top wall and said bottom wall.

* * * * *